July 25, 1972   A. G. SMITH ET AL   3,679,572
ELECTROCOATING APPARATUS WITH IONIZING RADIATION MEANS
Original Filed Sept. 7, 1967   2 Sheets-Sheet 2
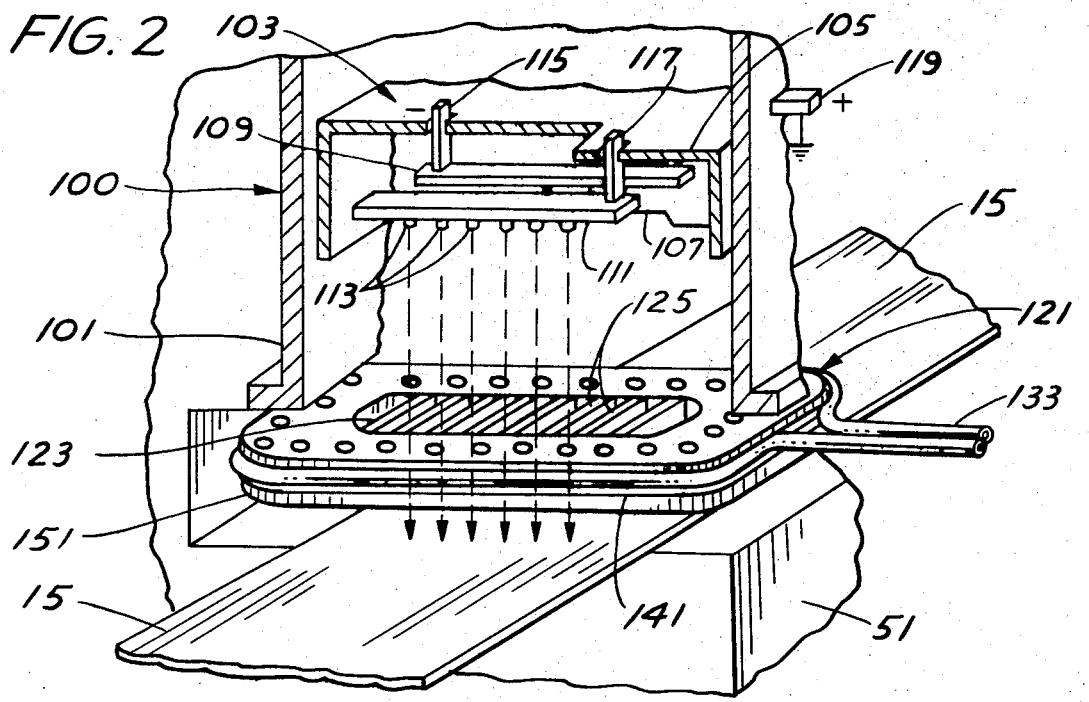
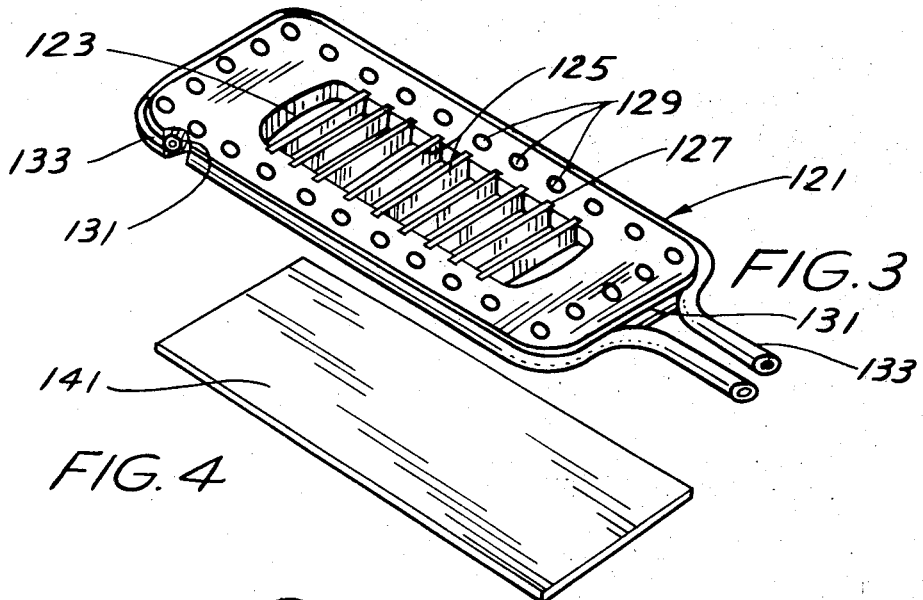
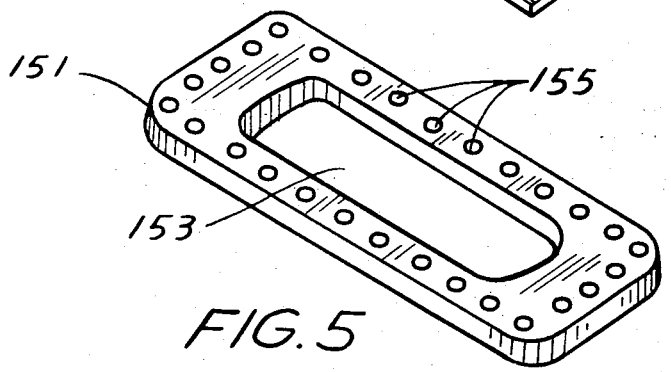
ARTHUR G. SMITH
ALLEN H. TURNER
INVENTORS
BY John R. Faulkner
Olin B. Johnson
ATTORNEYS

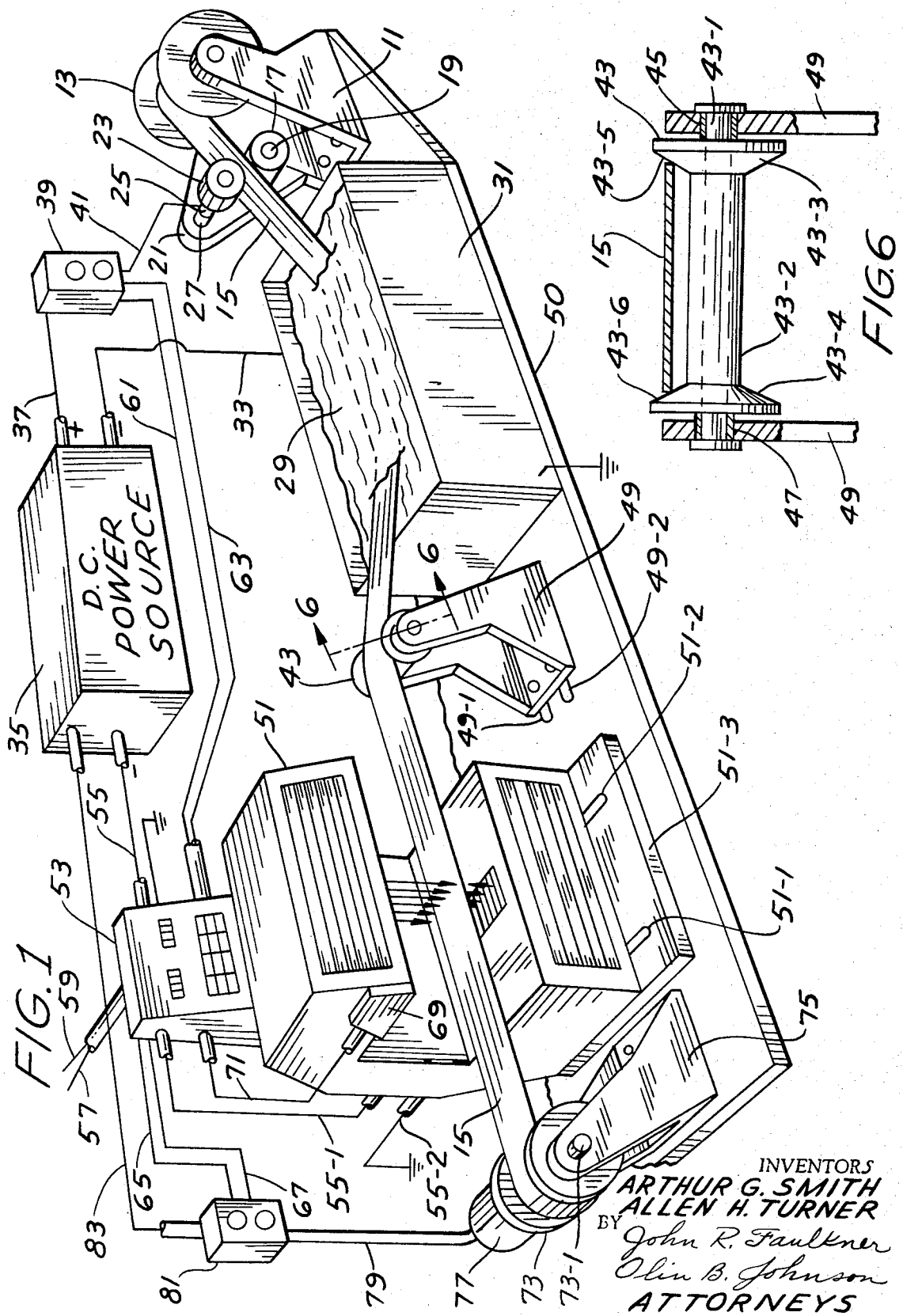

United States Patent Office 3,679,572
Patented July 25, 1972

3,679,572
ELECTROCOATING APPARATUS WITH IONIZING RADIATION MEANS
Arthur G. Smith, Livonia, and Allen H. Turner, Ann Arbor, Mich., assignors to Ford Motor Company, Dearborn, Mich.
Application Sept. 7, 1967, Ser. No. 666,338, now Patent No. 3,501,391, dated Mar. 17, 1970, which is a continuation-in-part of application Ser. No. 583,885, Oct. 3, 1966. Divided and this application Dec. 1, 1969, Ser. No. 881,020
Int. Cl. B01k 5/02; C23b 13/00
U.S. Cl. 204—300                                    4 Claims

ABSTRACT OF THE DISCLOSURE

A coating bath comprising paint binder resin is dispersed as anionic electrolyte in aqueous medium and characterized by being anodically depositable therefrom as a paint film that is crosslinkable by ionizing radiation having average energy in the range of 100,000 to 450,000 electron volts. In one embodiment, the major fraction of the paint binder resin is a homopolymerizable, alpha-beta olefinically unsaturated resin having per molecule at least one carboxyl group ionizable in the aqueous medium of the bath. In another embodiment, the major fraction of the paint binder is an alpha-beta olefinically unsaturated resin having per molecule at least one carboxyl group ionizable in the aqueous medium of the bath and a crosslinkable amount of vinyl monomers. Apparatus for use in electrodepositing and curing this coating material is also disclosed.

---

This application is a division of application Ser. No. 666,338 filed Sept. 7, 1967, now U.S. Pat. No. 3,501,391. Application Ser. No. 666,338 is in turn a continuation-in-part of application Ser. No. 583,885 filed Oct. 3, 1966, now abandoned.

This invention relates to a novel method for coating wherein a film-forming, polymerizable, organic coating material is electrodeposited upon an electrically conductive object immersed in aqueous medium and the resultant coating polymerized on said object by irradiation in gaseous medium. This invention further relates to novel coating materials for use in such method.

In the method of this invention, an olefinically unsaturated coating material, at least a major proportion of which is a carboxylic acid resin ionizable in aqueous solution of water-ionizable amino compound, is dispersed in an aqueous solution of amino compound, the resultant ionized resin is electrodeposited upon an electrically conductive workpiece moving through the bath by providing a difference of electrical potential between such workpiece and another electrode in contact with the bath, the resultant coated workpiece is removed from the aqueous medium into a gaseous medium and the freshly deposited coating is polymerized upon the surface of such workpiece with a beam of polymerization effecting electrons to a tack-free, durable, surface coating.

The exact nature and interrelation of the electrical, chemical, physical and electrochemical mechanisms, of deposition, reaction and dehydration associated with electrically induced deposition of polycarboxylic acid resin are not fully understood although the phenomena of electrophoresis, electroendosmosis, electrochemical conversion, etc., have been advanced by way of explanation. Such understanding, however, is not required to appreciate the unique advantages demonstrated in durable, tenacious, continuous coatings of quality finish that are obtainable via electron induced polymerization of freshly electrodeposited coating.

The instant resins have a relatively high molecular weight and can be formulated to be characterized in that they deposit to form a continuous film of high specific resistance and of essentially even depth. Such films are essentially electrically irreversible under the conditions of coating, i.e., by current reversal. However, little is known as to the resultant orientation of electrodeposited resin or resin and monomer and the physio-chemical conditions thereof in freshly deposited film. Thus, full explanation of the particular suitability of such films for electron induced polymerization is not readily available. Aside from the observable efficiencies and qualities of the instant process, other advantages accrue from the complementary nature of the steps therein, each acting in cooperation with those properties of the other which distinguish the same from other methods of deposition and polymerization. For instance, electron induced polymerization is extremely rapid, a matter of seconds as opposed to a plurality of minutes in conventional oven cure, and, while providing great savings in time and space, this characteristic of the process also presents problems in effecting cure without leaving areas of undercure or overcure. Opportunity for uneven cure with depth is reduced if the film is of even depth. Electrically induced deposition in accordance with the method of this invention is characterized by being self-leveling as a result of the growth of resistance with film deposition. Further, in conventional processes for applying paint, volatile solvents are commonly employed. In slow curing methods, the escape of such solvents presents no particular problem. With electron induced polymerization, this can result in the remnants of broken gas bubbles being solidified in place with resultant unsightly finish. The water-dispersible, electrodepositable paints used in the instant method can be, and preferably are, free of solvents that volatilize in significant quantities or at significant rates during the polymerization step. Still further, the energy released to a coating in electron induced polymerization can be controlled within extremely narrow limits and polymerization can be effected without significant temperature increase. This broadens the scope of electrically induced deposition coating by permitting the coating of electrically conductive products which are heat degradable and the formulation of electrodepositable coating materials which would be unsuitable for use with slower, high temperature cures.

The above-mentioned and other advantages of this invention will become apparent by reference to the following description taken in conjunction with the accompanying drawings, in which:

FIG. 1 is a schematic assembly view of one embodiment of equipment which may be used to carry out the method of this invention;

FIG. 2 is a partial schematic illustration of one embodiment of one of the two electron-discharge devices shown in FIG. 1;

FIG. 3 is a perspective view of one embodiment of a combination window-support grid and heat sink which forms a part of the device shown in FIG. 2;

FIG. 4 is a sheet of metal foil which serves as the electron window of the device shown in FIG. 3;

FIG. 5 is a perspective view of an apertured window-retaining member which frames the electron window of FIGS. 2 and 3 and holds such window in contact with the window-support grid and heat sink of FIG. 3; and FIG. 6 is a view taken along line 6—6 of FIG. 1.

Referring now to FIG. 1, a reel support stand 11 supports reel 13. Reel 13 formed of a suitable nonconductor, e.g., wood, plastics, etc., is rotatably mounted on stand 11 and carries a metal sheet stock 15. Upon being unwound from reel 13, the sheet stock 15 passes over idler 17 which may be the same as or of different design with respect to the idler of FIG. 6 which is hereinafter described. Idler 17 is rotatably mounted upon shaft 19 which in turn is supported by upright support member 21. Shaft 19 is a nonconductor and idler 17 is electrically insulated from ground. Sheet stock 15 passes under brush or roller contact 23. Contact 23 is supported by and in electrical contact with metal shaft 25. In a first embodiment, contact 23 is rotatably mounted on shaft 25. In a second embodiment, contact 23 is fixedly secured to shaft 25. Shaft 25 is supported by horizontal support member 27. Support member 27 is a nonconductor and is supported by upright support member 21. In a first embodiment, shaft 27 is a hollow shaft, a portion of shaft 25 extends into shaft 27 and is rotatably supported therein. In a second embodiment, shaft 25 is fixedly secured to the end of shaft 27.

After passing in electrical connection with contact 23, sheet stock 15 dips into an aqueous bath 29, a dispersion of alpha-beta, olefinically unsaturated, carboxylic acid resin and amino compound as hereinafter described. Bath 29 is retained in a coating tank 31 which serves as the grounded cathode of an electrodeposition cell. Tank 31 is in electrical contact with conductor 33 which in turn is in electrical contact with a direct current electrical power source 35. Also in electrical contact with power source 35 is conductor 37 which in turn is in electrical contact with metal shaft 25 via switch 39 and conductor 41. Thus, an electric circuit is established which includes sheet stock 15, contact 23, bath 29, grounded tank 31, conductor 33, power source 35, conductor 37, switch 39, conductor 41, and shaft 25.

A difference of electrical potential is maintained between sheet stock 15 and tank 31 that is in excess of the threshold deposition voltage of the resin employed. As used herein, the terms "threshold deposition voltage" or "threshold voltage" refer to the minimum voltage at which deposition of an electrically resistant film of the given resin is initiated. This will vary somewhat with the resin employed and/or the composition of the resin-amino compound comprising the dispersion. A high threshold deposition voltage is characteristic of a more stable dispersion. This minimum voltage will ordinarily be above about 5 volts and below about 20 volts. However, for practical residence times for most industrial coating operations, a voltage above about 50 volts will be required. More commonly, this voltage will be in the range of about 100 to about 250 volts. An upper limit on this difference of potential is dictated by the potential at which the deposited film will rupture if maintained throughout the bath residence period. This will also vary with the given resin but will ordinarily be below about 500 volts. In the preferred embodiments, at least the major proportion of the film is electrically irreversible under the conditions of coating.

The sheet stock 15 emerges from bath 29 bearing a continuous, resin-comprising coating of substantially even depth. The resin-comprising coating at this point in the process has not been cured and is relatively easily marred by physical contact. This coating should be handled as little as possible prior to polymerization.

In certain embodiments, however, it will be found advantageous to rinse the coating after it emerges from the bath to remove from the surface of the coating loosely associated or adhered coating materials. Where such need exists, the freshly coated sheet stock may be passed through a rinsing zone wherein the coated surface is contacted by water spray or shower.

In accordance with the method of this invention, the electrodeposited film is subjected to polymerization effecting radiant energy immediately after its formation, i.e., before significant post deposition dehydration is effected. The polymerization will ordinarily be effected within a time ranging from a few seconds to a few minutes, advantageously less than 10 minutes, and preferably less than 1 minute.

After the coated sheet stock 15 leaves the coating bath 29, it passes over idler 43, one embodiment of which is shown in greater detail in FIG. 6. Idler 43 is rotatably mounted via bearings 45 and 47 within and upon idler support stand 49. Idler 43 is a reel-like structure consisting of a central shaft 43-1 which extends through and rotates upon bearings 45 and 47, tubular support member 43-2 fixedly secured to shaft 43-1 and through which shaft 43-1 passes, circular support members 43-3 and 43-4 fixedly secured to support member 43-2 at opposite ends thereof. Circular support members 43-3 and 43-4 have sloping surfaces 43-5 and 43-6, respectively, against which the edges of sheet stock 15 ride as it is pulled over idler 43 causing the idler to rotate. Idler 43 is a nonconductor and insulates sheet stock 15 from ground. Idler support stand 49 is adjustably movable along the longitudinal axis of sheet stock 15 via slots 49-1 and 49-2 in base support 50.

After passing over idler 43, coated sheet stock 15 passes between a pair of electron emission units positioned within housing 51 which effect polymerization of the coating electrodeposited on sheet stock 15 to a tack-free state. An electron emission device suitable for this purpose and representative of the electron emission units within housing 51 is illustrated in FIGS. 2-5 inclusive and described in detail in connection with the description of such figures.

After passing between the aforementioned electron emission units, sheet stock 15, with the coating thereon polymerized to tack-free state, is wound around take-up reel 73. Reel 73 is formed of a nonconductive material which insulates sheet stock 15 from ground. Reel 73 is rotatably mounted on reel support stand 75. Reel 73 has a central shaft member 73-1 which is operatively connected with an electric motor 77. Motor 77 is in electrical connection with power source 35 via conductor 79, switch 81 and conductor 83. Motor 77 is also in electrical connection with ground.

When the desired amount of coated sheet stock is taken up on reel 73, the power to all circuits is shut off, sheet stock 15 is severed between housing 51 and reel 73, reel 73 is removed from reel support stand 75, a new take-up reel is installed on reel support stand 75, sheet stock 15 is affixed to the new reel and the process is again started.

While only two electron emission units are indicated in FIG. 1, it will be understood by those skilled in the art that the speed with which the sheet stock is moved through the polymerization zone can be increased by increasing the number of electron emission units employed for polymerization of the coating. Likewise the length of the coating bath can be extended to allow for increased line speed therethrough.

Housing 51 is adjustably movable along a line normal to the longitudinal axis of sheet stock 15 via slots 51-1 and 51-2 in base support member 51-3. Mounted on housing 51 is a control unit 53. Control unit 53 is in electrical connection with ground, with power source 35 via conductor 55, and with the cathodes of the electron emission units within housing 51 via conductor 55-1. Housing unit 51 and the anodes of the electron emission units within housing 51 are in electrical connection with ground via conductor 55-2. Control 53 is also in electrical connection with a master control unit, not shown, which may include electrically or electronically actuated programming means, via conductors 57 and 59. Control unit 53 is also in electrical connection with switch 39 via conductors 61 and 63 and switch 81 via conductors 65 and 67.

Mounted on the side of housing 51 downstream with respect to the coating bath and the polymerization zone is monitoring unit 69 adapted to constantly monitor the surface of sheet stock 15. Monitoring unit 69 is in electrical connection with control unit 53 via conductor 71. It is also in electrical connection with housing 51 and hence with ground. Monitoring unit 69 includes sensing means, e.g., photoelectric means, for constantly monitoring the condition of the coating film on sheet stock 15 as it passes from the polymerization zone, e.g., by measuring light reflection therefrom, and means for transmitting a constant evaluation thereof to control unit 53. It will be understood that other monitoring means, or monitoring means otherwise positioned, may also be used, e.g., contact friction measuring means, thickness measuring means, etc.

Control unit 53 comprises conventional electrical and/or electronic components operatively connected including switching means for activating and deactivating the electron emission units within housing 51, voltage control means for varying the potential of the electron beams employed in polymerization of the coating, transfer means for adjusting the spacing between electron emission units within housing 51 and sheet stock 15, means for receiving and effectuating programmed control signals from a master control unit to control the polymerization process, means to receive signals from monitoring unit 69 and terminate current flow in all circuits when imperfect coating is detected and/or transmit such signals to a master control unit, etc.

Referring now to FIG. 2, there is shown a cutaway view of the lower end of an electron-accelerator tube 100 comprising a main housing 101 containing a cathode assembly 103. Cathode assembly 103 comprises a cathode housing 105 having an elongated aperture 107 extending along a major portion of its lower side. Positioned within housing 105 is a pair of spaced apart bus bars 109 and 111 which hold between them in electrical communication therewith a plurality of tungsten-wire filaments 113 which serve as cathodes. Aperture 107 is of a size and configuration such as to direct a sheet of electrons emitted by the filaments 113 to the window area. In embodiments employing a scanned beam, a changing magnetic field is employed to direct the electron beam so as to achieve the desired distribution of electrons at the window surface. In electrical connection with bus bars 109 and 111, respectively, are conductors 115 and 117, each of which in operation is in electrical connection with the negative terminal of a direct-current electrical power source, i.e., power source 35 via conductor 55–1, control unit 53 and conductor 55 shown in FIG. 1. Conductors 115 and 117 the insulated from housing 101 and housing 105. The energy delivered to the negative leads 115 and 117 is controlled by conventional electrical control means, not shown, so that a slight difference of electrical potential, e.g., 5 volts, is maintained between negative leads 115 and 117 to establish a current through the filaments 113.

A conductor 119 provides the positive lead and is in electrical connection with housing 101 and with ground, i.e., via conductor 55–2 of FIG. 1.

Affixed to the bottom end of housing 101 by suitable fastener means, e.g., bolts, clamps, screws, etc., is a heat sink and window-support grid 121. Grid 121 is shown in greater detail in FIG. 3. In this embodiment, grid 121 is of copper or aluminum or an alloy thereof and has a centrally positioned, longitudinally extending aperture 123. A plurality of cross members 125 are seated in slots 127 and extend transversely across aperture 123. Grid 121 also has a plurality of threaded holes 129, the purpose of which is hereinafter explained. Grid 121 also has a peripheral groove 131 shaped to receive a conduit 133 for bringing a heat exchange fluid, e.g., water, into heat-exchange relationship with grid 121.

Positioned below grid 121 is window-forming sheet 141, a thin metal sheet which may be of aluminum; an alloy of aluminum containing minor amounts of lithium, titanium, beryllium, magnesium, and/or thorium; stainless steel, etc. Window-forming sheet 141 is shown in FIGS. 2 and 4 in enlarged thickness to facilitate its location and identification in the drawings. It is positioned so as to completely cover aperture 123 of grid 121 and extend on each side of aperture 123 a sufficient distance to be secured across grid 121 by window-retaining block 151.

Window-forming sheet 141 is in electrical communication with housing 101 and serves as an anode. Window- retaining block 151 is provided with a centrally positioned aperture 153 of essentially equal size and configuration as that of aperture 123 and has a plurality of threaded holes 155. Aperture 153 frames the window proper. The threaded holes 155 provide means for securing window-retaining block 151 to grid 121 so as to clamp window-forming sheet 141 to grid 121. Window-retaining block 151, window-forming sheet 141, grid 121 and housing 101 are fastened together as hereinbefore described using, where necessary, suitable gaskets, sealing rings, etc., not shown, so as to form a vacuum-type seal of the lower end of the housing 101. Also shown in FIG. 2 is a portion of sheet stock 15 of FIG. 1 passing through an electron beam from the electron accelerator above described.

The polymerization effecting electrons are provided by accelerating electrons to high energy in an evacuated tube, i.e., tube 100, and permitting the accelerated electrons to issue from the tube through an appropriate electron window such as the aforedescribed window-forming sheet 141 onto the coating to be polymerized. To provide area coverage, the electrons may be caused to issue from the tube in the form of a sheet, and the object to be irradiated may be moved through the electron sheet. The electron-emission unit above described is merely representative of a number of such devices which are suitable for this purpose. In one such device, electrons are accelerated as a narrow beam within an evacuated tube, and then a rapid scanning movement is imparted to the electron beam before it passes through the electron window and issues from the tube. In another such device, an electron beam is focused into sheet form within the tube by a system of cylindrical electron optics. See, for example, U.S. Pats. 2,602,751 and 2,680,814. Where precise focusing is not essential, the electron-emitting cathode or cathodes may simply be partially enclosed in a suitable housing within the tube which restricts and directs the electron beam to the electron window as in the emitter described and illustrated in the drawings.

The main housing 101, the window-forming sheet 141, window-support grid 121 and window-retaining block 151 with suitable gaskets, fastener means, etc., enclose and define an essentially gas-tight emission chamber which is substantially gas-evacuated by conduit and pumping means, not shown, e.g., to an air pressure as low as about $10^{-5}$ mm. Hg. The electron window-forming sheet 141 through which the electrons issue from the acceleration tube is a thin sheet of relatively light metal and should be as thin as feasible, e.g., 0.0001 inch, in order that the electrons may pass therethrough with minimum loss of energy. On the other hand, window-forming sheet 141 must have a sufficient mechanical strength to withstand a pressure differential of about one atmosphere since the interior will be exposed to the evacuated emission chamber and the exterior ordinarily will be exposed to atmospheric pressure.

The amount of beam current which can be transmitted through the electron window is determined by the physical properties of the window and the energy of the impinging beam. Part of the beam energy is inevitably given up in the form of heat while electrons are passed through the window. The grid 121 and window-retaining block 151 provide means for heat exchange with the window. Conduit 133 provides means for additional heat transfer via the circulation of a suitable coolant therethrough. The spacing of the grid components 125 represents a compromise between the advantages of maximum physical support and heat adsorption on the one hand and the advantages of minimizing interception of electrons passing between cathode and window-forming sheet 141 which serves as an anode. Other electron accelerator designs are described by A. J. Gale in U.S. Pat. 2,722,620 and by W. D. Coolidge in U.S. Pat. 1,907,507.

While the illustrated embodiment of the invention is one wherein the work to be coated is sheet material, it will be undertsood that the workpiece may be a series of individual objects which pass through the coating bath suspended from an overlead conveyor. In such an embodiment, the positions of the electron acceleration units would be modified in accordance with the shape and size of the workpiece, e.g., as by lateral displacement from the path of the conveyor-supported and freshly coated workpiece. It will also be understood that where the work is sheet material, the means for feeding, conveying, charging and collecting the sheet material may be modified in a variety of ways and still perform the functions of the corresponding means illustrated.

Referring now specifically to the coating material, "painting" by electrically induced deposition is herein meant to include the deposition of finely ground pigment and/or filler in the binder, i.e., the ionizable resin or polymer or the ionizable resin and vinyl monomer mix, the deposition of binder without pigment and/or filler or having very little of the same, but which can be tinted if desired, and the deposition of other water-reducible surface coating compositions containing the binder which might be considered to be broadly analogous to enamel, varnish, or lacquer bases, and the coating material for such deposition is herein termed a "paint." Thus, the binder, which is converted to a water-resistant film by the electrodeposition and ultimately converted to a durable film resistant to conventional service conditions by electron initiated polymerization, can be all or virtually all that is to be deposited to form the film, or it can be a vehicle for pigmentary and/or mineral filler material and/or other resins on which it exerts the desired action for depositing the film.

In one preferred embodiment, the binder comprises a polycarboxylic acid resin having alpha-beta, olefinic unsaturation and vinyl monomers. The percentage of vinyl monomers advantageously is above about 1 and below about 15, preferably above about 7 and below about 14.5, more preferably about 9 to about 14 percent by weight of the organic binder.

The carboxylic acid resin is characterized in having a molecular weight above about 1,000, advantageously in the range of about 2,000 to about 20,000 where the resin is a polyester type resin. With acrylic or other vinyl resins, the molecular weight is advantageously above about 5,000, e.g., in the range of about 5,000 to about 50,000 or higher. The resin is further characterized in having about 0.5 to about 3.0, preferably about 0.8 to about 2.0, alpha-beta olefinic unsaturation units per 1,000 units molecular weight, an acid number above about 30, e.g., 30 to 300, commonly 40 to 120, and an electrical equivalent weight in the range of about 1,000 to about 20,000, preferably 1,000 to 3,000. The resins employed herein are characterized in deposition behavior in that their deposition is essentially directly proportional with the direct current passing through the bath. This results from the fact that a film of high specific resistance builds with deposition. The resins employed in the method of this invention deposit as a film that is (1) substantially uniform in thickness providing the workpiece is of such configuration that substantially equal electrical inducement to coating can be achieved at all surfaces thereof for a significant period of time during the coating process, (2) essentially water insoluble, (3) of high specific resistance, (4) terminates at a maximum thickness for a given voltage, and (5) is quickly polymerizable by an electron beam to tack-free state. Electrically induced deposition of polycarboxylic acid resins which meet the first four of these properties is disclosed by A. E. Gilchrist in U.S. Pat. 3,230,162. So far as it is known, the binder resins heretofore employed for electrically induced deposition from aqueous bath have not been suitable for rapid cure by electron induced polymerization.

Radiation induced polymerization, including the use of an electron beam as the source of radiant energy, is exemplified in the art by U.S. Pats. 3,247,012; 3,188,229; 3,188,228; 3,188,165; 3,170,892; 3,146,146; 3,137,674; 3,131,139; 3,107,206; 3,088,791; 3,077,420; 3,077,419; 3,077,418; 3,077,417; 3,075,904; 3,013,895; 3,999,056; 2,964,456; 2,956,904; 2,955,953; 2,921,006; 2,904,481; and 2,900,277. So far as it is known, the materials described in this group of patents and other materials heretofore polymerized by radiant energy have not been employed or efficiently employable as water-dispersible, electrodepositable coating materials.

The novel paint binders of this invention are characterized by being both electrodepositable in the manner of the resins of the aforementioned Gilchrist patent and electron polymerizable by the methods set forth in the other patents hereinbefore listed.

Referring now specifically to bath 29, the aqueous dispersion will contain between about 0.5 and about 35 percent by weight of the dispersed binder material, advantageously about 3 to about 12 percent. The water soluble amino compound employed as a dispersal assistant is present somewhat in excess of the amount necessary to effect intimate dispersion of the resin and to impart anionic polyelectrolyte behavior to the same. The optimum quantity of amino compound to be employed will vary with the acid number of the resin. If the resultant pH is sufficiently high, the bath will absorb $CO_2$ from the atmosphere unless a controlled atmosphere is employed. The concentration of the amino compound or compounds will also affect the electrical resistance of the bath and is deemed excessive when the bath resistance falls substantially below about 500 ohm-cm. The proportion of amine used is in excess of the minimum amount necessary for imparting anionic polyelectrolyte behavior to the particular binder resin or resin mixture in the bath. Concentrations of about 1.5 to about 5.3 times such minimum have been found suitable. Specific resistance of the bath is advantageously between about 700 and about 1000 ohm-cm. Higher bath resistance will result in a thinner coating at a given potential difference and vice versa. A bath of pH as low as about 5 and as high as about 10 can be used. Advantageously the pH is between about 6.5 and about 8.5, preferably between about 7.0 and about 7.5.

Bath viscosity is advantageously maintained below about 30 times the viscosity of water. Bath temperatures in the range of about 15° to about 50° C. facilitate maintenance of bath stability and inhibit intrabath polymerization.

The term "water soluble amino compound" as herein employed includes ammonia and water soluble amines. Ammonia is less advantageous in this process for partially neutralizing the acid resin or resin mixture because it is highly volatile at operating temperatures and small additions of it can cause comparatively large changes in the pH of the bath. The amines used are amines that are soluble in water at 20° C. to the extent of at least about 1% basis weight of solution and include hydroxy amines, polyamines and monoamines such as: monoethanolamine, diethanolamine, triethanolamine, N-methyl ethanolamine, N-amino ethylethanolamine, N-methyl diethanolamine, monoisopropanolamine, diisopropanolamine, triisopropanolamine, "poly-glycol amines" such as

hydroxylamine, butanolamine, hexanolamine, methyldiethanolamine, octanolamine, and alkylene oxide reaction products of mono- and polyamines such as the reaction product of ethylene diamine with ethylene oxide or propylene oxide, lauryl amine with ethylene oxide, etc., ethylene diamine, diethylene triamine, triethylene tetramine, hexamethylene tetramine, tetraethylene pentamine, propylene diamine, 1,3-diamino-propane, imino-bis-propyl amine, and the like, and mono-, di- and tri-lower alkyl ($C_1$–$C_8$) amines such as mono-, di- and tri-ethyl amine.

To supplement the carboxylic acid resin in the bath as operations continue, additional binder concentrate composition is added continuously or incrementally. This concentrate optionally contains pigment. For ease of dispersion, the concentrate is advantageously in the form of a concentrated aqueous dispersion containing on a pigment and filler-free basis, about 50–95 percent by weight of polycarboxylic acid resin (straight or extended) and about 1–10 percent by weight water soluble amino compound based on the weight of the polycarboxylic acid resin, and the balance water.

The terms "radiation," "ionizing radiation," and "radiant energy" as employed herein mean radiation having a minimum energy of, or equivalent to 50,000 electron volts. The preferred method of curing films of the instant paint binders upon the substrates to which they have been applied is by subjecting such films to a beam of polymerization effecting electrons which at its source of emission, i.e., upon emerging from the electron window, is within the range of, or equivalent to, about 100,000 to about 450,000, preferably about 200,000 to about 350,000, electron volts.

By varying the space between the electron source and the film in relation to the potential of the beam, the difference in polymerization rates with depth can be minimized. Within the aforementioned range of potentials, it is preferred to maintain a minimum voltage of about 25,000 volts per inch separation between emitting means and the film to be cured. In accordance with this process, the distance between emitting means and the film on the workpiece can be varied from about 2 feet to the minimum clearance compatible with the contours of the workpiece. Ordinarily, a space range of about 2 to about 18 inches will be most efficient. The correlation of space distance with emission potential becomes increasingly important with an increase in either space distance or film depth. At the closer spacings, voltages in the lower portion of the range can be successfully employed. Higher voltages permissible throughout this range becomes necessary at the greater distances to provide the desired uniformity of polymerization rates with depth. When operating in the range of about 200,000 to 300,000 electron volts, spacings in the range of about 2 to about 12 inches are preferred.

Although the tolerance to overexposure will vary somewhat with film composition, the time required to effect substantially complete polymerization of the film at its maximum depth ordinarily should not be greater than twice the time required to polymerize the most easily polymerized portion of the film. Preferably, this time is less than 1.5 times the period required to obtain the first polymerization. The temperature of the film should be insufficient to cause significant evaporation of the most volatile component thereof both before and during polymerization. Keeping within these limitations, dose rates in the range of about 0.01 to about 15, preferably 0.1 to 10/megarads/sec. have been found suitable.

The term "rad." as employed herein means that dose of radiation which results in the absorption of 100 ergs of energy per gram of absorber, i.e., coating film.

The term "acrylic monomer" as used herein means an alpha-beta monounsaturated monocarboxylic acid or esters thereof and includes, but not by way of limitation, acrylic acid, alkacrylic acids, e.g., methacrylic acid, monohydric alcohol esters of acrylic acid and alkacrylic acids, e.g., glycidyl methacrylate, 2-hydroxy-ethyl methacrylate, etc.

The acid number of resins without appreciable anhydride groups can be determined with KOH by the ASTM standard method 555-54. If appreciable anhydride groups are present, the acid number can be determined by refluxing a 1.5–2 gram sample of the portion of the resin for 1 hour with 50 ml. of 0.5 N aqueous KOH and 25 ml. of pyridine, then back titrating with 0.5 N HCl of a phenolphthalein end point.

The electrical equivalent weight of a given resin or resin mixture is herein defined as that amount of resin or resin mixture that will deposit per Faraday of electrical energy input under the conditions of operation hereinafter set forth. For this purpose, the value of one Faraday in coulombs is herein taken to be 107.88 (atomic weight of silver)÷0.001118 (grams of silver deposited by one coulomb from silver nitrate solution) or 96,493. Thus, if 0.015 gram of coating, the binder polycarboxylic acid resin moiety of which is 90% by weight and the balance of which is amino compound used to disperse it in the bath is transferred and coated on the anode per coulomb input to the process, the electrical equivalent weight of the resin is about 1303 or $0.015 \times 107.88 \div 0.00118$.

By way of further illustration, the electrical equivalent weight of a particular polycarboxylic acid resin or resin mixture can be found simply and conveniently for typical process conditions standardized on as follows: a polycarboxylic acid resin concentrate is made up at 65.56° C. (150° F.) by thoroughly mixing 50 grams of polycarboxylic acid resin, 8 grams of distilled water and diisopropanol amine in an amount sufficient to yield resin dispersion pH of 7.8 or slightly lower after the concentrate has been reduced to 5% by weight resin concentration with additional distilled water. The concentrate is then diluted to 1 liter with additional distilled water to give 5% resin concentration in the resulting dispersion. (If a slight insufficiency of the amine has been used, and the dispersion pH is below 7.8, pH is brought up to 7.8 with additional diisopropanol amine.) The dispersion is poured into a metal tank, the broadest side walls of which are substantially parallel with and 2.54 cm. out from the surface of a thin metal panel anode. The tank is wired as a direct current cathode, and the direct current anode is a 20 gauge, 10.17 cm. (4 inches) wide, tared steel panel immersed in the bath 7.62 cm. (3.5 inches) deep. At 26.67° C. (80° F.) bath temperature, direct current is then impressed from anode to cathode at 100 volts for 1 minute from an external power source, the current measured by use of a coulometer, and the current turned off. The anode panel is removed immediately, rinsed with distilled water, baked for 20 minutes at 176.67° C. (350° F.) and weighed. All volatile material such as water and amine is presumed to be removed from the film for practical purposes by the baking operation. The difference between tared weight of the fresh panel and final weight of the baked panel divided by the coulombs of current used, times 107.88, divided by 0.001118 gives the electrical equivalent weight of the resin for purposes of this invention.

In another preferred embodiment, the polymerizable portion of the binder consists essentially of polymers which are homopolymerizable. Thus, in this embodiment, the vinyl monomer component of the formulation can be omitted although it is within the scope of this invention to employ polymerizable monomers with these resins as in the previously described embodiment. In this embodiment, the binder polymer has a molecular weight above about 250, at least 1 and preferably at least 2 dissociable carboxyl groups per molecule, and at least 2 units of alpha-beta olefinic unsaturation per molecule. Advantageously, such units of unsaturation are terminal with respect to the polymer when the latter is essentially linear and are present in the concentration range of about 2 to about 4 of such units per 1,000 units molecular weight.

These polymers may comprise the sole component of a paint binder or be employed in combination with other polymers and/or monomers with which they are copolymerizable by ionizing radiation. With a view to the intended end use and the presence or absence of other unsaturated components in the coating formulation, the molecular weight of such polymers may range upward from the aforestated minimum to an average molecular weight of several thousand or more. In dispersing certain embodiments of these polymers in an aqueous bath and in the electrodeposition thereof upon a conductor, it will be found advantageous to employ therewith a compatible organic solvent which, depending upon the desired end product, may either be removed by volatization prior to curing or retained as a plasticizer in the cured film. Such solvent will facilitate formation of a continuous and adherent film upon electrodeposition.

The polymers of this invention can be prepared by reacting a base polymer having at least 2 functional groups per molecule, i.e., hydroxyl, amino, carboxyl, anhydride, mercapto, or epoxide groups, with an organic compound having alpha-beta olefinic unsaturation, preferably di-, or poly-, carboxylic acid or anhydride. Where the polymer is electrodeposited the resultant polymeric product must contain sufficient ionizable functional groups within its molecular structure to admit of dispersion in an aqueous bath and subsequent electrodeposition, e.g., dissociable carboxylic groups in the case of anodic deposition. These ionizable functional groups may be originally present in the aforementioned base polymer or on the organic compound with which it is reacted. The illustrated products are linear copolymers with terminal alpha-beta olefinic unsaturation units.

This invention will be more fully understood from the following illustrative examples.

EXAMPLE 1

A silicone-modified, polyester type, polycarboxylic acid resin is prepared from the following components:

|  | Moles | Grams | Ml |
|---|---|---|---|
| Maleic anhydride | 0.63 | | |
| Tetrahydrophthalic anhydride | 1.61 | | |
| Neopentyl glycol | 2.48 | | |
| Polysiloxane (25% by weight) | | 175.0 | |
| Xylene | | | 70 |
| Hydroquinone | | 0.2827 | |

The polysiloxane employed is a commercially available (Dow Corning Z–6018) hydroxy-functional, cyclic, polysiloxane having the following properties.

Hydroxy content, Dean-Stark:
    Percent condensible _____ 5.5
    Percent free _____ 0.5
Average molecular weight _____ 1600
Combining weight _____ 400
Refractive index _____ 1.531–1.539
Softening point, Durran's:
    Mercury method, degrees F. _____ 200
At 60% solids in xylene:
    Specific gravity at 77° F. _____ 1.075
    Viscosity at 77° F. (Gardner-Holdt, A–1), centipoises _____ 33

The glycol, the polysiloxane and the xylene are added to a four neck liter flask, heated to a temperature of about 160° to about 165° C. for about 2 hours while being stirred and under a nitrogen atmosphere. The reaction mixture is cooled to about 125° to about 130° C., the maleic anhydride, the tetrahydrophthalic anhydride and the hydroquinone are added and the temperature is increased slowly to about 190° to about 200° C. which is maintained for about 3.5 hours and to an acid number of about 47.7. The heating is stopped, the xylene is stripped, and the mixture is cooled to about 80° C. About 45.0 grams styrene and about 45.0 grams methylmethacrylate are added. The acid number of this binder solution is then determined to be about 43.4. This binder solution is hereinafter termed Binder A.

A mill base is prepared from the following components:

Grams
Titanium dioxide _____ 90
Binder A _____ 50.8
Styrene _____ 7.0
Methylmethacrylate _____ 7.0

This mixture is placed in a ball mill and milled for approximately 38 hours. This mill base is hereinafter termed Mill Base 1.

A resin-monomer dispersion is prepared from the following components:

Grams
Mill Base 1 _____ 13.8
Binder A _____ 66.2
Diisopropanolamine _____ 7.3
Distilled water _____ 312.7

The amine and water are blended in a high speed mixer. The mill base and the binder are premixed and then poured into the vortex of the aqueous mixture of amine and water. The resultant mix is blended for 10 minutes. Blending is stopped for 5 minutes and then continued for 5 minutes. Blending is stopped for 20 minutes and then continued for 5 minutes. After 5 minutes, the dispersion is stirred with 400 grams of distilled water. The resulting emulsion has about 10 wt. percent solids.

This emulsion is placed in a tank which serves as the cathode of an electrodeposition cell. Steel sheet stock is coated by providing a difference of electrical potential between the cathode and the sheet stock (anode) of about 100 volts for about 1 minute.

The sheet stock is removed from the bath into a nitrogen atmosphere and the essentially uniform and continuous coating thereon is polymerized to tack-free state by passing the coated panel through an electron beam. The conditions of irradation employed are as follows:

Voltage _____ 275 electron kilovolts.
Current _____ 15 milliamperes.
Total dosage _____ 10 megarads.
Passes through beam _____ 2.
Line speed _____ 10 ft./min.
Atmosphere _____ Nitrogen.
Distance, electron window to work _____ 7 inches.

EXAMPLE 2

A paint is prepared, electrodeposited from an aqueous bath upon a metal panel and polymerized by an electron beam as in the previous example except for the difference hereinafter set forth.

To a reaction vessel are added the following materials:

|  | Moles | Grams | M |
|---|---|---|---|
| (a) Methylmethacrylate | 2.6 | | |
| (b) Ethylacrylate | 5.0 | | |
| (c) Glycidyl methacrylate | 1.7 | | |
| (d) Methacrylic acid | 2.0 | | |
| (e) Xylene | | | 1,000 |
| (f) Benzoyl peroxide | | 10 | |
| (g) Hydroquinone | | 0.2 | |

The xylene is heated to 130° C. under a nitrogen blanket and stirred continuously. The monomers (a), (b), and (c), the reaction initiator (f) and the hydroquinone (g) are added to the xylene. The monomers (a), (b) and (c) are added separately and incrementally over a period of about 3 hours. The charge is heated at 130° to 133° C. for about 3 hours. The charge is cooled to about 50° C.

The methacrylic acid (d) is added to the charge and the temperature is raised to 138° C. gradually and maintained until an acid number of about 60 is obtained. The xylene is then removed.

The acrylic polymer thus formed is admixed with styrene and methylmethacrylate in the same proportions as in the preceding example.

The voltage employed in electrodepositing the binder solution is about 170 volts. The bath pH is about 7.3. The amine employed is diisopropanolamine.

The following conditions are employed in irradiating the coated panels thus prepared.

Potential _____ 295 kv.
Current _____ 1 milliampere.
Atmosphere _____ Helium.
Line speed _____ 6.5, 312 and 1.6 cm./sec.
Distance, emitter to panel __ 10 inches.
Passes through beam _____ 2.
Dose _____ 2.5, 5 and 10 megarads.

EXAMPLE 3

A polyester type, polycarboxylic acid resin is prepared from the following components:

| | Grams |
|---|---|
| Fumaric acid | 222.9 |
| Tetrahydrophthalic anhydride | 925.1 |
| Trimetholpropane monoallyl ether | 1477.2 |

The above materials are mixed with 250 ml. of xylene and 0.02% hydroquinone. The mixture is heated at 190° C. until 130 ml. of water is removed and an acid number of about 50 is reached. The solvent is removed with a stream of nitrogen gas and a yield of about 2486 grams is obtained.

Using a conventional blender, 300 ml. of water is mixed with 26 ml. of 1 normal diisopropanolamine. Thirty (30) grams of the resin is slowly added and stirring is continued for 30 minutes. The resulting dispersion is diluted with water to 390 grams total weight. This material has approximately 0.9 alpha-beta olefinic unsaturation groups per 1.000 units molecular weight.

Steel panels pretreated in a conventional zinc-phosphating process are used as anodes in an electro-deposition cell wherein the aforementioned dispersion serves as the electrolyte and its retainer, the coating tank, serves as the cathode. The immersed area of the anode is 37.4 cm.$^2$ (5.2 cm. x 7.2 cm.). The cathode-anode spacing is about 2 inches. A potential difference between anode and cathode of about 100 volts is applied for about 1 minute and a resinous film of essentially uniform depth is deposited. The initial current between anode and cathode is about 0.82 ampere and this drops with increase of electrical resistance attributable to the deposited film to about 0.07 ampere. This results in a deposition of about 0.218 gram of resin upon the panel with a utilization of about 8.8 coulombs of charge or an electrical equivalent weight of $$\frac{(2.18)(96,493)}{(8.8)} = 2100$$

The anode is removed from the bath and contacted with an electron beam. The distance between the electron window and coated panel is about 12 inches. The atmosphere is air. Electron emission is at 280,000 electron volts. The coating is subjected to a total dosage of about 40 megarads and a tack-free film is obtained.

This procedure is repeated except that a binder solution is prepared by admixing styrene monomer with the resin prior to dispersion in the bath. Upon irradiation in like manner, it is found that a tack-free film is obtained with a dosage of about 10 megarads. The mixture employed contains about 12% styrene and about 88% resin.

This procedure is repeated except that ½ of the styrene is replaced with methylmethacrylate.

EXAMPLE 4

The procedure of Example 1 is successively repeated with the concentration of binder in the coating bath adjusted to 0.5, 12, and 35 percent by weight in separate runs.

EXAMPLE 5

The procedure of Example 1 is repeated with the electrical potential employed in electrodepositing the binder reduced to 50 volts with residence time for the workpiece in the bath extended to 3 minutes.

EXAMPLE 6

The procedure of Example 2 is repeated with the electrical potential employed in electrodepositing the binder increased to 250 volts.

EXAMPLE 7

The procedure of Example 1 is repeated with the potential of the electron beam reduced to about 150 electron kilovolts and line speed reduced to 2 feet per minute.

EXAMPLE 8

A polymer is prepared in the following manner:

(1) To a flask equipped with a stirrer, dropping funnel, thermometer, condenser, and nitrogen inlet, is added at room temperature the following ingredients:

| | | |
|---|---|---|
| Resin A | grams | 313.5 |
| Itaconic anhydride | do | 214 |
| Benzyl dimethyl amine | do | 10 |
| Dioxane | ml | 275 |

Resin A is an epoxy resin having an epoxy equivalent of 185–192, the resinous product formed by conventional reaction of epichlorohydrin and bisphenol A in the presence of caustic. This resinous product has the following characteristics:

| | |
|---|---|
| Average mol wt. | 380 |
| Equivalent hydroxyl content per 1,000 grams resin | 0.06 |
| Equivalent weight, gms. resin to esterify mole acid | 85 |
| Viscosity at 25° C., poises | 100–160 |

(2) The charge is heated in a nitrogen atmosphere at reflux temperature for 4 hours. Titration with aqueous NaOH indicates that all of the anhydride has reacted and that 50% of the theoretical carboxyl value of the anhydride remains.

(3) The solvent (dioxane) is removed by distillation followed by vacuum distillation.

(4) A light amber colored resinous product, a viscous liquid, is recovered.

An electrodeposition bath is formed by admixing 100 grams of product so prepared with 200 ml. water and 26.8 ml. diethylamine and stirring until a dispersion of the resin is obtained. This dispersion is further diluted with water until 1 liter of bath is obtained. This liquid is then employed as the bath of an electrodeposition cell in which the metal container of the bath serves as the cathode. A metal workpiece, a zinc phosphate-treated sheet steel, is immersed in the bath and employed as the anode of such cell. Electrodeposition of the dispersed resin upon the anode is effected by impressing a difference of electrical potential between anode and cathode of about 32 volts for 1 minute. The average distance between anode and cathode is about 3 inches and the current at the end of 1 minute is about 0.2 ampere. The area coated on each of the two major sides of the workpiece is about 6 square inches. The workpiece is removed from the bath and immediately rinsed with water.

The coating thus obtained upon the workpiece is polymerized to tack-free state by passing the workpiece through a beam of polymerization effecting electrons. The following conditions are employed in irradiating the coated workpiece thus prepared:

| | |
|---|---|
| Beam potential | 270 kv. |
| Current | 1 milliampere. |
| Atmosphere | Nitrogen. |
| Distance, emitter to workpiece | 10 inches. |
| Dose | 12 megarads. |

EXAMPLE 9

The procedure of Example 8 is repeated with the single difference that about 5 ml. xylene is added to the electrodeposition bath and electrodeposition is carried out at a difference of potential of about 15 volts for 1 minute.

EXAMPLE 10

The procedure of Example 8 is repeated except that the polymer is prepared in the following manner:

(1) To the reaction flask is charged 313 grams of Resin A of Example 8 and 175 grams of diethanolamine.

(2) This solution is maintained at 70° C. and 275 ml. of dioxane are added thereto over a period of about 3 hours.

(3) The reaction mixture is heated at reflux temperature for about 3 hours.

(4) The resinous product obtained is recovered from the solvent and identified as Resin B.

(5) The Resin B produced as above described is admixed with 428 grams of itaconic anhydride and 500 ml. of dioxane under a nitrogen blanket. The reaction is exothermic and the temperature rises to about 55° C. The contents of the reaction vessel are maintained at a temperature of about 40°–50° C. overnight and the polymer thus obtained is separated from the solvent.

An electrodeposition bath is prepared as in Example 8 with the differences being the use of the polymer produced above with sufficient dioxane added to provide a Gardner Viscosity of about Z3.

Electrodeposition and electron initiated polymerization is then carried out as in Example 8.

The term "base polymer" is employed in this application to include dimers, trimers, and tetramers as well as higher molecular weight polymers.

The term "dispersion" as employed herein in relation to intimate dispersal of polymer with an aqueous coating bath is meant to convey the broad meaning of such term, i.e., to include colloidal suspensions, emulsions, solutions, etc.

The foregoing examples are solely for purposes of illustration and should not be considered as limitations upon the true scope of the invention as set forth in the claims.

We claim:

1. Apparatus for use in coating an electrically conductive object comprising in combination
   (1) bath retention means adapted to retain an aqueous coating bath,
   (2) a first electrode at least partially within said coating zone,
   (3) electrical energy supply means constructed and arranged to provide a difference of electrical potential between said object and said first electrode when said object is in said coating zone and both said object and said first electrode are in contact with an aqueous coating bath which extends from said object to said first electrode within said coating zone,
   (4) electron emission means within a polymerization zone adjacent said bath retention means comprising an electron accelerator device constructed and arranged to project an electron beam having energy above 100,000 electron volts upon said object as said object is moved through said polymerization zone,
   (5) conveyor means for transporting said object through said coating bath, said polymerization zone and said electron beam,
   (6) electron beam adjustment means in connection with said electron emission means constructed and arranged to adjust the electron beam impinging upon said object as said object is moved through said polymerization zone, and
   (7) electronically actuated control means positioned outside said polymerization zone, in electrical connection with said adjustment means, and constructed and arranged to actuate and control said adjustment means.

2. Apparatus for use in coating an electrically conductive object comprising in combination:
   (1) bath retention means adapted to retain an aqueous coating bath,
   (2) a first electrode at least partially within said coating zone,
   (3) electrical energy supply means constructed and arranged to provide a difference of electrical potential between said object and said first electrode when said object is in said coating zone and both said object and said first electrode are in contact with an aqueous coating bath which extends from said object to said first electrode within said coating zone,
   (4) electron emission means within a polymerization zone adjacent said bath retention means comprising an electron accelerator device constructed and arranged to project an electron beam having energy in the range of 100,000 to 450,000 electron volts upon said object as said object is moved through said polymerization zone,
   (5) conveyor means for transporting said object through said coating bath, said polymerization zone and said electron beam,
   (6) electron beam adjustment means in connection with said electron emission means constructed and arranged to adjust the electron beam impinging upon said object as said object is moved through said polymerization zone, and
   (7) monitoring and measuring means electrically connected with said electron emission means, adapted to measure the coating upon said object while said object is moved through said polymerization zone and to effect actuation of said adjustment means when said measurement exceeds predetermined limits.

3. Apparatus in accordance with claim 2 wherein said monitoring means measures light reflections from said object.

4. Apparatus in accordance with claim 2 wherein said monitoring means measures thickness of coating upon said object.

References Cited

UNITED STATES PATENTS

| | | | |
|---|---|---|---|
| 2,138,938 | 12/1938 | Plensler | 204—300 XR |
| 2,820,752 | 1/1958 | Heller | 204—300 XR |
| 3,290,235 | 12/1966 | Gilchrist | 204—181 |
| 3,437,514 | 4/1969 | Burlant | 117—93.31 |
| 3,501,390 | 3/1970 | Turner | 204—181 |
| 3,502,563 | 3/1970 | Schmidt | 204—300 XR |

JOHN H. MACK, Primary Examiner

A. C. PRESCOTT, Assistant Examiner

U.S. Cl. X.R.

204—181